INVENTOR.
Charles M. Browne
BY
Nobbe & Swope
ATTORNEYS

United States Patent Office 3,056,696
Patented Oct. 2, 1962

3,056,696
ULTRATHIN FILMS
Charles M. Browne, Toledo, Ohio, assignor to Libbey-Owens-Ford Glass Company, Toledo, Ohio, a corporation of Ohio
Filed June 4, 1958, Ser. No. 739,867
5 Claims. (Cl. 117—211)

The present invention relates broadly to ultrathin films for glazing units and, more particularly, it has to do with the application of such films to glass sheet surfaces and the maintaining of predetermined areas thereof free from film by the employment of a special masking coating.

The use of ultrathin films of many kinds is well known. One especially important group are electrically conducting films which have been shown to have particular utility in the provision of de-icing windows or windshields for aircraft, automobiles and other vehicles. Another is light modifying films for controlling or selecting the light transmitted through the film. It is with regard to electrically conducting films, or coatings, that the present invention will be described in the preferred embodiment.

Several ways in which glazing units having electrically conducting films can be produced and employed for the prevention or removal of fog, frost or ice are to be found in Patent No. 2,429,420, granted October 21, 1947, to Harold A. MacMaster, in Patent No. 2,567,331, granted September 11, 1951, to Romey A. Gaiser et al., and in many others.

It is conventional in the production of glazing units of the above character to apply the film, or electrically conducting layer, by spraying a suitable chemical solution such as a metal halide, onto the glass surface while it is maintained at an elevated temperature. The solution subsequently dries into a tough, durable, transparent electrically conductive layer that is strongly adherent to the surface of the glass.

However, during the spraying of the film onto the surface of the glass sheet, the spray solution has a tendency to deposit on the edges of the glass sheet and even on the opposite side of the sheet from the surface desired to be filmed. The filming material on the edges of the glass sheet, if not removed may produce an electrical short circuit of the film to the sash of the mounting frame in which the glazing unit is secured. Also, the application of the filming solution to the opposite side of a glazing unit in the viewing areas of the unit obscures vision and unnecessarily reduces the transmission of light therethrough. Therefore, it is desirable to prevent the depositing of the filming solution onto these surfaces by masking or covering them with an easily removable material.

Moreover, certain units are so constructed that portions of the film may heat excessively, and it may be desirable to reduce the heating in these portions. This may be accomplished by isolating these portions of the film electrically from the remainder of the film by leaving unfilmed areas between the two portions. These unfilmed areas, conventionally referred to as deletion lines, prevent electrical energy from being supplied from the electrodes to certain of the "hot" portions of the film, and increasing the resistance of the film in other "hot" portions by lengthening the film path between the electrodes, both of which keep the heating of the film within acceptable limits.

One method of providing unfilmed portions of a specified position and shape is to use a masking compound. A suitable material for this purpose must adhere to the glass surface, not scratch or mar the glass surface, not permit filming compound to contact the glass surface, and must be easily removable from the glass after the filming operation.

One material that has rather recently been used as a masking compound is sodium sulfate. However, certain disadvantages are encountered in its use, for example, it was found that a layer of sodium sulfate on a glass surface because of its inherent porosity still permitted specks of filming solution to be deposited on the surface. Also, it was found necessary to process the sodium sulfate in a ballmill in order to obtain the required consistency before it could be used.

It is the primary object of this invention to provide an improved masking material for protecting portions of the surface of a body during the application of an ultrathin film thereto.

Briefly, the method of the invention is to provide a protective coating having colloidal graphite as one of its ingredients to preselected surface areas of a body prior to the application of a filming material thereto in order to prevent the formation of a film on these preselected areas.

In the drawings wherein like numerals are employed to designate like parts throughout the same:

Figure 1:
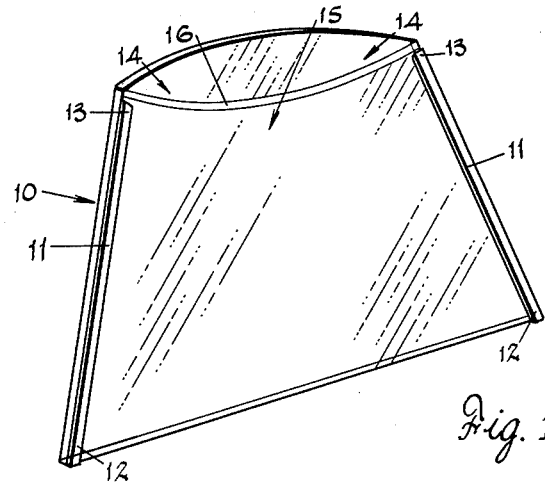
FIG. 1 is a perspective view of a sheet of glass prior to being treated according to the invention.

Referring now to the figures, there is illustrated in FIG. 1 a glass sheet 10 on which an electrically conducting film is to be applied. It is a customary practice according to one method of manufacture of such films, to apply electrodes 11 along a pair of opposed margins prior to the application of the film thereon. These electrodes may be made in any one of a number of different ways. For our purposes, they will be considered to be provided by applying a silver and glass frit along the marginal portions and fired-on by heating the sheet to a suitable temperature.

It is to be noted that the electrodes 11 are skewed in regard to one another so that their opposed extremities 12 are separated from each other a greater distance than the other opposed extremities 13. Accordingly, if the surface of the glass sheet 10 between the electrodes is filmed with a film of uniform thickness and surface resistivity, a greater current will be caused to flow in the film adjacent the extremities 13 than through the film in the regions adjacent the extremities 12. Therefore, as was discussed above, in order to reduce the temperature of the high current portions of the film these "hot" portions 14 will be electrically isolated by providing deletion lines between the areas 14 and the remaining film 15. This deletion line, or deletion band, illustrated at 16 is curved so that the resistance path of the remaining film 15 between the electrodes at the extremities 13 is lengthened to approximate the corresponding resistance path at 12, which keeps the temperature of the film 15 in this region within acceptable bounds.

Figure 2:
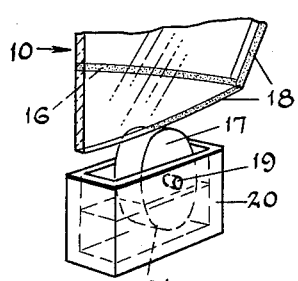
FIG. 2 illustrates the application of a protective coating to the edges and predetermined lineal areas of the sheet of glass shown in FIG. 1.

In FIG. 2 there is illustrated a wetting wheel 17 which may be employed in applying the masking material to the edge portions 18 of the glass sheets or onto predetermined lineal areas for producing the deletion lines 16. This wheel is mounted on an axle 19 which in turn is mounted for rotation on a reservoir 20 containing a supply of the masking compound so as to dispose the lower peripheral portions 21 of the wheel 17 in contact with the masking compound. When the glass sheet is moved into contact with and past the wheel 17 the wheel turns and transfers the masking compound from the peripheral portions 21 to the sheet.

Figure 3:
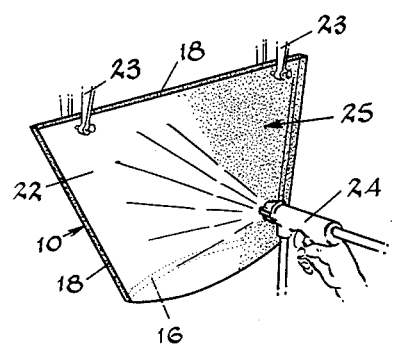
FIG. 3 is a perspective view showing the spraying of the novel protective masking compound onto the back surface of a sheet, which surface is to be left unfilmed.

Although the masking material may be applied by a number of different ways well known in the art, it has been found preferable, when applying this masking material to relatively large surface areas, such as the back surface 22, to spray a solution of the masking compound of suitable consistency onto the surface. Thus, in FIG. 3 the sheet 10 is shown being carried by tongs 23 past a spray gun 24 shown manually operated to apply a spray 25 of protective coating material onto the back surface 22 of the sheet.

Figure 4:
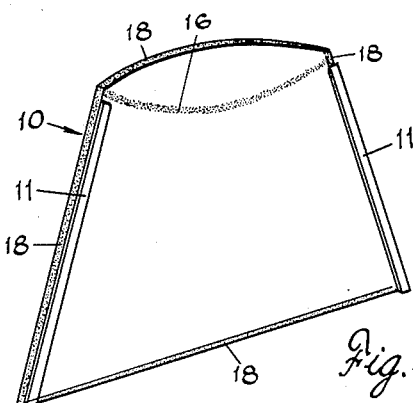
FIG. 4 is a perspective view of the sheet of glass with predetermined areas masked off according to the invention.

FIG. 4 shows the sheet of glass 10 after it has been provided with protective coatings on the edges and over preselected portions of the major areas of the sheet.

Figure 5:
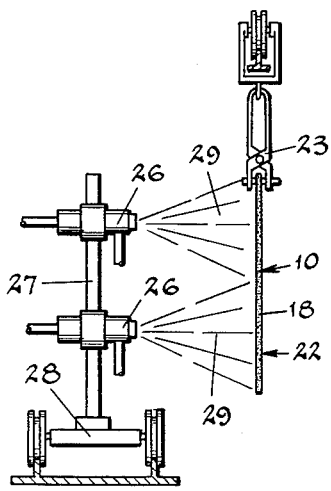
FIG. 5 is an end view of a conventional filming apparatus.

Next, the glass sheet is conventionally carried by tongs 23 into and through a tunnel-type furnace (not shown) where the temperature of the glass is raised to a point above the annealing temperature of the glass preparatory to filming. The heated sheet is then removed from the furnace and carried past spray guns 26 (see FIG. 5) mounted on a vertical post 27 secured to a base 28. These spray guns apply a spray 29 of a suitable filming compound, such as tin halide solution, to the glass sheet. The filming solution hardens into a tough, electrically conductive coating on the surface of the glass sheet and over the masking compound.

The novel masking material of the invention comprises a suspension of colloidal graphite in a suitable carrier, such as isopropanol. This masking compound has been found to prevent the formation of even slight amounts of film on the sheet areas that it covers. Moreover, the compound adheres to a glass sheet surface at temperatures as high as 1250° F. and without marring, scratching or staining the glass. Still further this masking material may be relatively easily removed by brushing, rubbing or scrubbing. The two methods of removal which produced the most satisfactory results are scrubbing the masked areas with a bristle brush, or cleaning with whiting.

However, it has been found to enhance the properties of the collodial graphite to mix it with a filler such as sodium sulfate which will improve the adherence of the masking material to glass, especially upon subsequent heating. For example, such a mixture can be made providing 100 parts of powdered sodium sulfate to 17 parts of a colloidal graphite suspension in isopropanol. The colloidal graphite suspension referred to was obtained commerically under the designation of Dag No. 154 from the Acheson Colloids Co., Port Huron, Michigan.

Although the invention has been treated herein as being applied to electrically conducting films, it is not meant to restrict its use to these films. For example, the novel masking material would be equally satisfactory for use with films applied to glass sheets for restricting the transmission of light to certain wave lengths, reducing glare and many other types of films.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. A method of producing an ultrathin transparent oxide film, resulting from the reaction of a filming compound with a heated surface, on a selected area of a glass surface which comprises, applying a readily removable coating of colloidal graphite in a highly volatile vehicle to said surface outside of said selected area, heating said coated surface to filming temperature, applying said filming compound to said heated surface, and subsequently removing said colloidal graphite from said surface.

2. The method of providing a glass sheet with a transparent film on certain areas while leaving other areas free from film, comprising coating said other areas with a mixture of colloidal graphite and sodium sulfate and applying a filming material to said sheet.

3. The method of providing an electrically conducting film on a glass sheet as claimed in claim 2, in which said mixture consists of approximately 100 parts of sodium sulfate to 17 parts of a suspension of colloidal graphite.

4. The method of providing a glass sheet with an electrically conducting film on certain areas while leaving other areas free from said film, which comprises coating said other areas with a mixture of colloidal graphite and sodium sulfate, heating the coated sheet to substantially the softening point of the glass, and spraying the heated sheet with a solution of a filming compound.

5. A masking material for preventing the deposition of ultrathin transparent films, which comprises a mixture of colloidal graphite and sodium sulfate.

References Cited in the file of this patent

UNITED STATES PATENTS

| | | |
|---|---|---|
| 1,550,629 | Paulus | Aug. 18, 1925 |
| 1,614,263 | Spencer | Jan. 11, 1927 |
| 1,619,343 | Haverstick | Mar. 1, 1927 |
| 2,000,310 | White et al. | May 7, 1935 |
| 2,016,381 | McBurney | Oct. 8, 1935 |
| 2,196,128 | Stuart | Apr. 2, 1940 |
| 2,405,449 | Robinson et al. | Aug. 6, 1946 |
| 2,559,969 | Kennedy | July 10, 1951 |
| 2,871,623 | Marini | Feb. 3, 1959 |

FOREIGN PATENTS

| | | |
|---|---|---|
| 284,218 | Great Britain | June 24, 1929 |